US011293817B2

(12) United States Patent
Staton et al.

(10) Patent No.: US 11,293,817 B2
(45) Date of Patent: Apr. 5, 2022

(54) TRANSPARENT CERAMIC COMPOSITION

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 259 days.

(21) Appl. No.: 16/653,279

(22) Filed: Oct. 15, 2019

(65) Prior Publication Data

US 2020/0056949 A1 Feb. 20, 2020

Related U.S. Application Data

(63) Continuation-in-part of application No. 15/863,558, filed on Jan. 5, 2018, now Pat. No. 10,444,088.

(60) Provisional application No. 62/443,388, filed on Jan. 6, 2017.

(51) Int. Cl.
*G01L 1/16* (2006.01)
*C04B 35/581* (2006.01)
*G01L 5/00* (2006.01)

(52) U.S. Cl.
CPC ............ *G01L 1/167* (2013.01); *C04B 35/581* (2013.01); *G01L 5/0052* (2013.01); *C04B 2235/3869* (2013.01)

(58) Field of Classification Search
CPC ......... G01L 1/167; G01L 5/0052; G01L 1/16; G01L 1/142; C04B 35/581; C04B 2235/3869; G01K 11/14; G01M 5/0025; G01M 5/0091; G01M 3/38
See application file for complete search history.

(56) References Cited

U.S. PATENT DOCUMENTS

| 2,950,576 | A | 8/1960 | Rubenstein |
| 3,467,973 | A | 9/1969 | Minnick |
| 3,783,568 | A | 1/1974 | Adler et al. |
| 4,860,851 | A | 8/1989 | Krevor et al. |
| 5,348,363 | A | 9/1994 | Fink |
| 5,422,712 | A | 6/1995 | Ogino |
| 6,811,880 | B1 | 11/2004 | Clough |
| 6,955,834 | B2* | 10/2005 | Rohrbaugh ............... C09D 7/61 427/180 |
| 7,155,343 | B2* | 12/2006 | Grant ...................... G01V 9/00 702/2 |
| 7,461,726 | B2 | 12/2008 | Hawkins et al. |
| 8,303,027 | B2 | 11/2012 | Murakami et al. |
| 8,558,194 | B2* | 10/2013 | Wolfe ................ G01N 21/8422 250/461.1 |

(Continued)

FOREIGN PATENT DOCUMENTS

EP 2607420 6/2013

OTHER PUBLICATIONS

PCT Application No. PCT/US18/12643, International Search Report and Written Opinion, dated Mar. 7, 2018, 9 pages.

(Continued)

*Primary Examiner* — Freddie Kirkland, III
(74) *Attorney, Agent, or Firm* — Avek IP, LLC

(57) ABSTRACT

Embodiments of transparent ceramic particles are described. A particle includes an outer shell having an outer surface and an inner surface forming a hollow core; and a response unit housed inside the hollow core.

20 Claims, 3 Drawing Sheets

(56) References Cited

U.S. PATENT DOCUMENTS

| | | | |
|---|---|---|---|
| 9,371,669 B2 | 6/2016 | Berg et al. | |
| 9,488,916 B2* | 11/2016 | Bourke, Jr. | A61N 5/0624 |
| 9,557,479 B2* | 1/2017 | Suntsova | G05D 24/00 |
| 9,568,448 B2* | 2/2017 | Gole | G01N 27/127 |
| 9,575,219 B2* | 2/2017 | Ravichandran | B82Y 30/00 |
| 9,578,434 B2* | 2/2017 | Wang | B32B 1/08 |
| 9,675,953 B2* | 6/2017 | Oldenburg | B01J 13/20 |
| 9,759,286 B1* | 9/2017 | Staton | C08K 3/045 |
| 10,444,088 B2* | 10/2019 | Staton | E01C 11/265 |
| 10,575,541 B2* | 3/2020 | Bourke, Jr. | A23L 3/263 |
| 10,952,621 B2* | 3/2021 | Kane | A61B 5/1459 |
| 2001/0043546 A1 | 11/2001 | Kumacheva et al. | |
| 2005/0011710 A1 | 1/2005 | Hitchcock et al. | |
| 2006/0190177 A1* | 8/2006 | Grant | G01V 9/00 |
| | | | 702/2 |
| 2007/0138583 A1* | 6/2007 | Ofek | G01H 11/06 |
| | | | 257/417 |
| 2007/0138593 A1 | 6/2007 | Ofek | |
| 2008/0139722 A1 | 6/2008 | Shefelbine et al. | |
| 2008/0182056 A1 | 7/2008 | Bakker et al. | |
| 2009/0050428 A1 | 2/2009 | Kloucek et al. | |
| 2009/0326140 A1 | 12/2009 | Shimada et al. | |
| 2010/0089772 A1 | 4/2010 | Deshusses et al. | |
| 2010/0108306 A1 | 5/2010 | Cooper | |
| 2011/0051775 A1 | 3/2011 | Ivanov et al. | |
| 2011/0171137 A1 | 7/2011 | Patolsky et al. | |
| 2014/0311221 A1* | 10/2014 | Gole | G01N 27/127 |
| | | | 73/31.06 |
| 2016/0040743 A1* | 2/2016 | Staton | F41C 23/06 |
| | | | 2/412 |
| 2016/0250612 A1 | 9/2016 | Oldenburg et al. | |
| 2016/0363727 A1* | 12/2016 | Suntsova | B32B 7/06 |
| 2018/0195913 A1* | 7/2018 | Staton | G01F 23/0007 |

OTHER PUBLICATIONS

Lakes et al., Analysis of High Volume Fraction Irregular Particulate Damping Composites, ASME, vol. 24, Apr. 2002, pp. 174-178.

* cited by examiner

TRANSPARENT CERAMIC COMPOSITION

CROSS-REFERENCE TO RELATED APPLICATIONS

This application is a continuation-in-part of U.S. patent application Ser. No. 15/863,558, filed Jan. 5, 2018, which claims priority to U.S. Provisional Patent Application No. 62/443,388, filed Jan. 6, 2017, the disclosures of each of which are hereby incorporated by reference in their entireties.

BACKGROUND

Transparent ceramics (also known as "Transparent Aluminum") include but are not limited to materials such as aluminum oxynitride. Aluminum oxynitride (or "AlON") is a ceramic powder made of aluminum, oxygen, and nitrogen. In the visible spectrum, AlON is optically transparent. Additionally, AlON is one of the hardest and strongest polycrystalline transparent ceramics available today. The transparent nature of the ceramic, combined with its enormous strength makes it a desirable material for use in high-impact environments, such as in military and law enforcement applications. Specifically, AlON has been used in bulletproof and blast-resistant windows and in military infrared optics.

Because AlON is a ceramic powder, it can be fabricated in many different shapes, including but not limited to windows, plates, domes, rods, tubes, etc. using conventional ceramic powder processing techniques. This makes the material very attractive to many different industries beyond the military. Unfortunately, however, the material can be extremely costly to manufacture in large quantities, and the expansion into other industries has been slow.

As research continues to evolve, making the manufacture of AlON more cost effective, it may become increasingly implemented as a building material because of its many benefits. It would be advantageous for an AlON construction material (or composition) to be further configured for implementation into a controlled response system for reducing the effects of impacts on a surface comprising the AlON composition.

SUMMARY

The following presents a simplified summary of the invention in order to provide a basic understanding of some aspects of the invention. It is not intended to identify the critical elements of the invention or to delineate the scope of the invention. Its sole purpose is to present some concepts of the invention in a simplified form as a prelude to the more detailed description that is presented herein.

In one embodiment, a particle includes an outer shell having an outer surface and an inner surface forming a hollow core; and a response unit housed inside the hollow core. The outer shell comprises aluminum oxynitride.

In another embodiment, a system for sensing and providing a controlled response to changes in a particle environment, includes a particle having an outer shell and a hollow inner core, and a response unit housed inside the hollow inner core. An external excitation source activates the response unit.

In still another embodiment, a system for sensing and providing a controlled response to changes in a particle environment includes a particle having an outer shell and a hollow inner core, and a response unit housed inside the hollow inner core; an external excitation source; and a sensor. The response unit is activated by the external excitation source, which causes an ascertainable reaction by the response unit, and the sensor senses the reaction.

According to a further embodiment of the invention, a system for sensing and providing a controlled response to changes in a particle environment includes a particle defined by an outer shell, a hollow inner core, and a response unit housed inside the hollow inner core. The response unit is configured to transmit data to a user. The particle is distributed within a carrier. An external excitation source activates the response unit to transmit a unique attribute about the carrier.

In yet a further embodiment, a method for sensing and providing a controlled response to a particle environment includes first providing a particle having an outer shell and a response unit housed inside the outer shell. The response unit is configured to transmit data to a user and provide a controlled response based on the transmitted data. The method further includes activating an external excitation device to actuate the response unit to determine a first attribute about an environment of the particle, transmitting the first attribute from the response unit; and activating the external excitation device to actuate the response unit to provide a controlled response based on the first attribute.

According to still another embodiment, a system for sensing and providing a controlled response to a change in a particle environment has a particle having an outer shell, a response unit housed inside the outer shell, and a sensor housed inside the outer shell. The sensor determines the presence of a force upon the particle, and the response unit is activated in response to the force.

BRIEF DESCRIPTION OF THE SEVERAL VIEWS OF THE DRAWINGS

Illustrative embodiments of the invention are described in detail below with reference to the attached figures, wherein.

DETAILED DESCRIPTION

Figure 1:
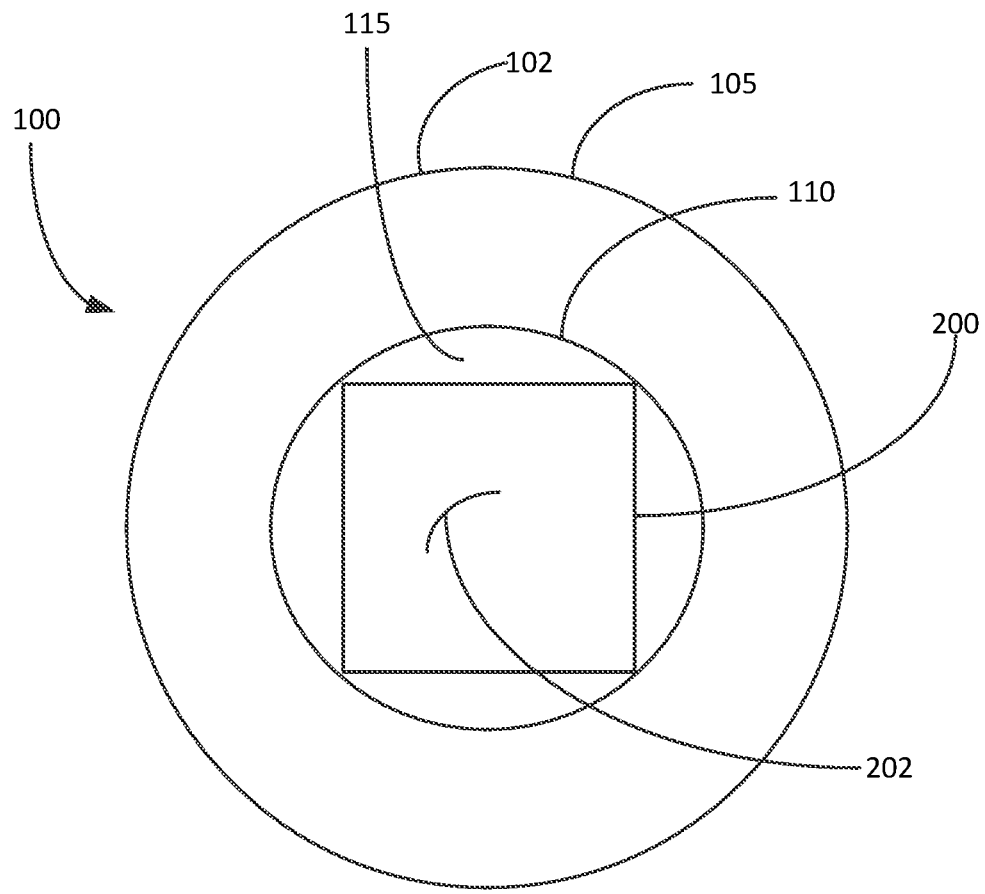
FIG. 1 is a schematic illustration of a bead according to an embodiment of the invention.

Specially formed damping particles may be implemented into various compositions and/or construction materials, as described in U.S. patent application Ser. Nos. 15/365,923 and 15/678,392. Such implementation of damping particles into a composition or a material may allow the composition or material to resist breakage, and even to respond to impacts received by composition or material. In embodiments, the particles may be tunable based on the resonant frequency of the impact, such that the impact does not have a lasting effect on the composition or material. Sensors may be deployed at or near the composition or material to gather detailed information about the impact(s), such as the frequency and amplitude of the impact, and this information may in turn be used in tuning the particles. In some embodiments, the particles may be multi-modal. In other words, some of the particles may act to dampen the effects of an impact, while some others of the particles may have sensory capabilities. Here, it may be unnecessary for the composition or material to have separate sensors deployed at or near the composition or material, because the particles themselves may be capable of providing all of the sensory data needed for tuning. Regardless of where the sensor is located, however, information from the material may be sensed in real time, and the particles may be adjusted accordingly. Effects of impacts (e.g., movement, sound, etc.) can thus be reduced.

It is clear that many benefits can be recognized by incorporating the particles having superior damping effects into a material or composition. The ability of the particles to expand and compress, or to be tuned according to a known resonant frequency, allows the material or composition to readily adapt to changes in its environment. Generally speaking, incorporating the particles into a particular material or composition makes the material or composition act more elastic. However, in embodiments, it may be desirable for a particular material or composition to have increased strength without the need for certain elastic properties, but to still be able to sense attributes related to its environment in order to provide a controlled response.

In one embodiment of the invention, a transparent material, such as AlON, magnesium aluminate spinel ($MgAl_2O_4$), yttria-alumina garnet, Yttralox, single-crystal aluminum oxide, etc., may be used to form beads which have locale and/or remote sensing and controlled response capabilities, as will be described in greater detail herein. It shall be understood by those of skill in the art that the beads described herein can be incorporated into any number of various materials and/or compositions, and that the examples provided herein are therefore not limiting. The beads described herein may exploit the benefits of certain materials, including but not limited to the strength, formability, and the unique transparent nature of the materials, while providing a unique and novel way to sense environmental changes and provide a quantifiable response in reaction to said environmental changes. The beads may range in scale from nano- to macro-, and anywhere between.

Referring now to FIG. 1, according to an embodiment of the invention, a bead 100 includes a shell 102 having an outer shell surface 105 and an inner shell surface 110. A void 115 is formed within the inner shell surface 110. A response unit 200 may be situated within the void 115 to provide the bead 100 with the various capabilities that is described herein. The bead shell 102 may be constructed of aluminum oxynitride, or any other transparent or semi-transparent material, such that the bead 100 is at least partially transparent in the visible electromagnetic spectrum. The bead 100 is shown in FIG. 1 as being spherical in nature. However, it shall be understood that the bead 100 can be any shape, including buckyball-shaped, spherical, cubical, rod-shaped, planar, concave, convex, etc.

The response unit 200 may include one or more controlled response elements 202 which may be electronic, electromagnetic, chemical, electrochemical, mechanical and/or electromechanical elements and may be passive or dynamic in operation. An external excitation may initiate a response by the controlled response element 202, which may be some measurable change in the bead 100 (e.g., vibration, sound, light, temperature, etc.). According to one example, the controlled response element 202 is one or more chemical compounds that changes phase or properties in response to an external excitation. In another example, the controlled response element 202 is a piezoelectric crystal. As is known to those of skill in the art, the piezoelectric crystal can convert electrical energy into mechanical movement, or vice versa, in a controlled response to an external excitation. In some embodiments, the response unit 200 may be a sensor (e.g., camera, video recorder, solar cell, energy harvesting device, etc.) which is embedded within the bead 100. The material coating may provide both electrical isolation and a protective outer layer to prevent harm to the sensors. Because the material is at least partially transparent, and in some embodiments, entirely transparent, the sensor may have substantially unobstructed visibility through the encapsulation. Accordingly, cameras and other optical devices may be industrially hardened. These beads 100 may then be embedded into other transparent materials such as windows, glass, polycarbonate, circuit boards, body parts, etc. to provide sensing capabilities to these materials, as is discussed in greater detail below. Accordingly, the beads 100 are capable of both adding strength and controlled action to the environment in which the beads 100 are located.

Additional benefits, including electrical insulation provided by the encapsulation of response unit 200 within beads 100, may also be recognized. Electrical isolation of sensors can provide safety protection to sensitive electronic components embedded within beads 100 (e.g., as part of the response unit 200) as well as allow operation in high voltage or field-strength environments. Furthermore, the material properties of the material chosen for the bead 100 can be utilized electrically as a ceramic plate capacitor or ceramic resonator between multiple bead elements 100. Applications may include laser stimulated excitation sensors that are powered, instructed, and accessed through a single beam of light. Other embodiments may include capacitive energy storage devices that utilize the insulating ceramic shells of bead elements 100 to store energy in repeatable charge and discharge cycles effectively creating a transparent battery.

Figure 2:
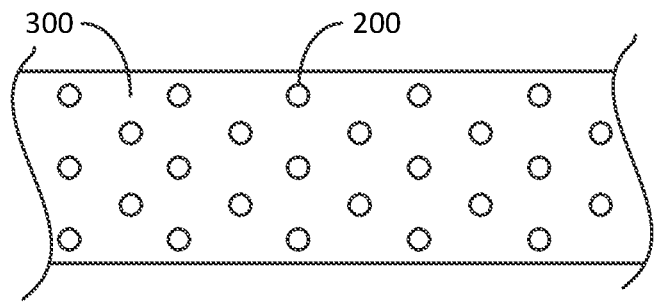
FIG. 2 is a schematic illustration of a carrier incorporating a plurality of beads of FIG. 1.

The beads 100 may be incorporated into a variety of different environments to form a superiorly robust sensing and control system. In a first embodiment, illustrated in FIG. 2, a plurality of beads 100 are distributed throughout a carrier 300. The carrier 300 can be any substance or composition capable of having the beads mixed therein. In embodiments, the carrier 300 is configured as a conformal coating capable of covering an assortment of different surfaces and/or materials. Often conformal coatings are used in the electronics industry to prevent damage to circuit boards and other electronic components. However, conformal coatings may be used in other industries as well, especially for any surface where it would be desirable to prevent corrosion or other damage to the surface. For example, it may be desirable for a section of metal ground pipe to be coated in a conformal coating which may prevent the pipe from rusting.

As is known to those of skill in the art, there are a number of different conformal coatings that are readily available on the market. A conformal coating may be solvent or water-based, and in some embodiments may require UV curing. The coating may be acrylic, urethane, silicone, or varnish-based. It shall be understood that all chemistries of conformal coatings, whether now known or later developed, are contemplated within the scope of the invention. In embodiments, it may be desirable for the coating material to cure transparent or substantially transparent such that a user can see through the coating. Once the conformal coating material is selected, the beads 100 may be mixed into the coating material before it is applied to the surface. In embodiments, the mixing may occur by the user, whereby the user acquires the beads 100 separately from the coating material. In other embodiments, the coating may be purchased by a user with the beads 100 already distributed therethrough. Regardless, the coating may be applied according to methods known to those of skill in the art. Once the coating is applied to the surface, it is allowed to cure depending on the requirements of the specific coating material. The beads 100 in the coating may result in a coating with an additional layer of physical strength which may be added to the surface receiving the coating. At the same time, the beads 100 may provide sensing and response capabilities as described herein.

Figure 3:
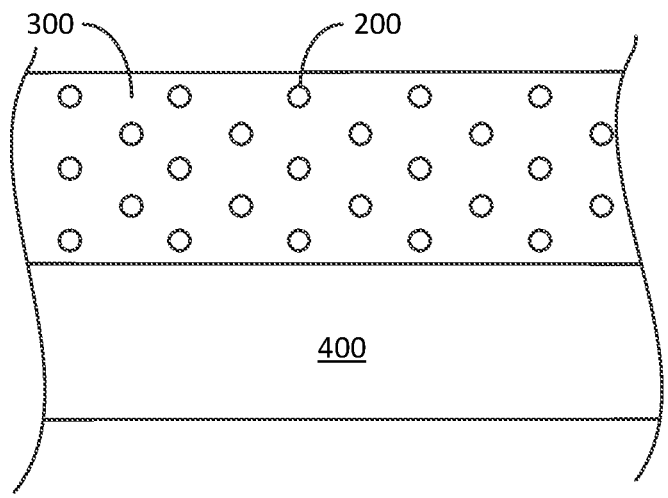
FIG. 3 is a schematic illustration of a carrier incorporating a plurality of beads of FIG. 1 as a conformal coating on a surface.

As discussed briefly above, the coating may be utilized, for example, as a coating for a ground pipe 400 (FIG. 3). The coating may be applied to the outside of the pipe 400 and allowed to cure. The strength of the beads 100 distributed throughout the coating 300 may help to prevent punctures in the pipe 400. Where an impact with the pipe 400 may otherwise result in a puncture, the beads 100 may prevent such distress. Additionally, the beads 100 may be able to provide environmental information about the health of the pipe 400 and/or the pipe contents. For example, once the coating 300 is applied to the pipe 400, the coating 300 may be tuned to a particular resonant frequency which may signify that the pipe 400 is "healthy" (e.g., does not have significant weak spots which may result in rupture). When the pipe 400 is empty, an external excitation source (e.g., a laser or any other external excitation source) can "ping" the pipe 400 at one or more locations. The excitation may cause the response unit 200 inside the bead 100 to resonate. Sensors located at or near the coated surface may receive the frequency of the response, which may be compared against the known resonant frequency for a healthy pipe. If the frequency of the response is within a certain range, the user may know that the pipe 400 is healthy in the location of the excitation. On the other hand, if the frequency of the response is outside the range, then the user may know that the pipe 400 has a weak spot or potential puncture.

Attributes of the contents of the pipe 400 may additionally or alternately be ascertained based on similar methods. The response frequency of a pipe section 400 that is filled to ½ capacity may be different than a pipe section 400 filled to ¾ capacity. Accordingly, it may be possible to determine how much liquid is in a pipe section 400 simply by providing an external stimulus to the coating 300.

In determining specific characteristics of the pipe 400 itself, or the contents of the pipe 400, the beads 100 may function in a substantially passive mode. In other words, the beads 100 may simply receive an external excitation which causes the response unit 200 to react. The reaction may be sensed by a sensor, and that information can be used to ascertain some characteristic. However, the beads 100 may also (or alternately) function in a substantially active or dynamic mode. Here, the response unit 200 may react in a physical, chemical, or electrical (or electromagnetic or electrochemical) manner that provides a specific change to the coating or the environment. In sticking with the example of a piezoelectric crystal inside the bead 100, the excitation of the crystal as a result of the external stimulus may cause a physical vibration of the crystal. For example, a section of the pipe 400 may receive an external excitation to determine the capacity of the section of the pipe 400. The sensed response to the external excitation may reveal to the user that the section of the pipe 400 being tested appears to have a blockage. In response, the user may provide to the section of the pipe 400 a second external stimulus which may cause the piezoelectric crystals (and therefore the beads 100) to vibrate. This vibration of the beads, which may be imperceptible to the user (e.g., in the subnanometer range) may be sufficient to clear the blockage, thereby allowing the fluid in the pipe 400 to again flow freely. It shall be understood by those of skill in the art that this is merely an example of a controlled response that the beads 100 may give in reaction to an external stimulus. Other controlled responses (e.g., changes in temperature) are further contemplated within the scope of the invention.

In embodiments, it may be desirable for the coating 300 to be transparent such that a user can view a section of the pipe 400 through the coating. As AlON is optically transparent in the visible spectrum, the addition of the beads 100 to the coating 300 does not hamper a user's ability to see through the otherwise transparent coating 300. Here, the coating 300 may be applied as a layered approach to the surface of the pipe 400, each layer providing specific information to the user. For example, flammable liquids may be transported through pipes 400 (or in tanker trucks, containers, etc.), and may become inflamed if the liquid reaches a certain temperature. Here, temperature-sensitive coatings may be applied to the pipe 400 (or other vessel, as the case may be) which may turn colors upon reaching a certain pre-determined temperature. For example, the pipe 400 may include a first layer which may be red (for example). A second layer may be applied atop the first layer, which may be yellow (for example). The second layer may be configured to become transparent at temperatures above a certain threshold (e.g., 200° F.) such that, above the threshold, the first layer is visible. A third layer may be applied atop the second layer, which may be green (for example). The third layer may be configured to become transparent at temperatures above a certain threshold (e.g., 150° F.) such that, above the threshold, the second layer is visible. The conformal coating 300 having the beads 100 distributed therein may be applied atop the third layer. In this way, a user can see through the conformal coating 300, and be able to tell if the pipe 300 is above a certain predetermined threshold temperature. Specific conformal coating layers may also be capable of fluorescing or producing transmissive (or reflective) wavelengths of light by utilizing components contained within the response units 200, such as LED, oLED, electroluminescent particles, carbon nanotubes, etc.

Figure 4A:
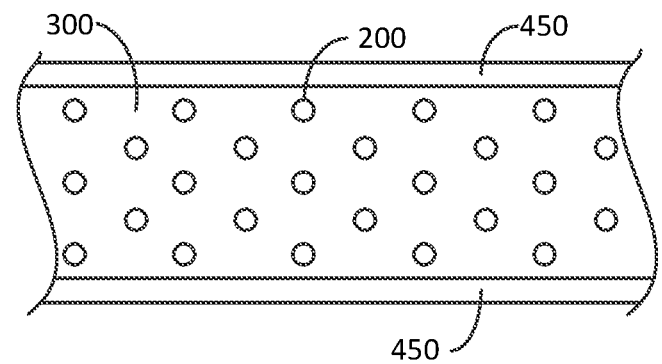
FIG. 4A is a schematic illustration of a carrier incorporating a plurality of beads of FIG. 1 disposed between two panels.
Figure 4B:
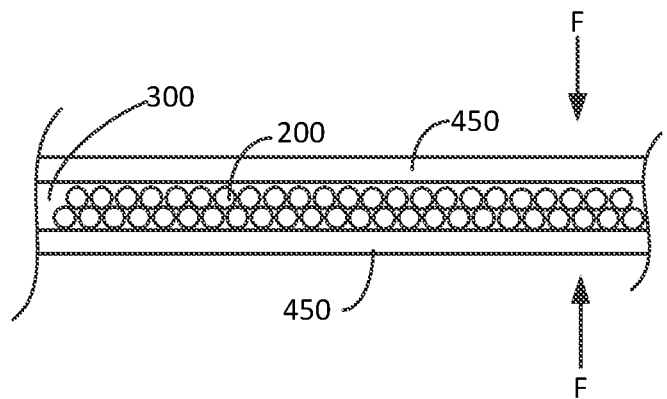
FIG. 4B is a schematic illustration of the two panels of FIG. 4 receiving a force causing compression of the carrier.

In embodiments, it may be preferable for the carrier 300 to be somewhat flexible when cured, such as a gel, foam, caulk, or plastic, for example. The carrier 300 may take the form of an adhesive, or be capable of being adhered to or disposed on a surface. Referring now to FIGS. 4A and 4B, the carrier 300 may be applied between two panels 450. It shall be understood that the panels can but need not be substantially flat and/or parallel. The panels 450 can be manufactured of any material, including but not limited to glass, wood, plastic, etc. When the carrier 300 is applied between the two panels 450, the panels 450 may benefit from the various properties of the carrier material. For example, assume that the carrier 300 is a gel-like adhesive that is applied between the two panels 450. The panels 450 may benefit from the elasticity inherent in the adhesive material in deflecting or damping small forces received by one or more of the panels (e.g., sound waves, etc.). When a larger force is applied to one or more of the panels 450 (represented by F in FIG. 4B), the force may cause the panels 450 to be compressed together. The beads 100, which may otherwise be somewhat regularly distributed throughout the carrier may be forced together as shown in FIG. 4B. The panels 450 however, may be restricted from compressing beyond a certain point, e.g., the distance of the diameter of the bead 100 or stacked beads 100, because the bead material may be strong enough to withstand many forces that may be received by such panels 450.

This may be especially beneficial where it is desirable to ensure that two panels 450 do not compress beyond a certain point. For example, in some situations, it may be undesirable for two plates to come into contact with one another. The beads 100 may be designed to have a diameter that exceeds the minimum allowable distance between the two plates 450. This ensures that the plates 450 do not come into contact with one another. Measurements between the two plates 450 can be made electrically through measured impedance readings between the two plates 450 directly as well as capacitively coupled measurements between a specific plate 450 and a plurality of beads 100 in respect to the other plate 450. For example, if the beads 100 come in direct physical contact with the two plates 450 there would be a definitive reading of capacitance between the two plates via conducting an alternating current through the beads 100 outer shell(s) allowing a measurable conduction path between the two plates 450.

At the same time, the beads 100 may include a response unit 200 as described herein for providing a controlled response to an external excitation source. Here, the force F received on the panels 450 may excite the response unit 200. A sensor located at or near the panels 450 may sense the spectral response of the response unit 200 as a result of the force F. From the spectral response, a user may be able to determine the health of the panels, the strength of the force F received by the panels, and/or other attributes.

In one embodiment, the carrier 300 may allow for movement of the beads 100 after the carrier 300 is cured. For example, consider a situation where a carrier fluid 300 (e.g., gas, liquid, gel, etc.) is distributed between two panes of glass surrounded by a frame. The carrier fluid 300 has a plurality of beads 100 dispersed throughout. Here, the response units 200 of a plurality of beads 100 may react in conjunction with one another in order to provide a more focused controlled response. For example, a sensor (which may be a standalone sensor or may be one or more of the response units 200 themselves) may determine that a force is continually hitting one of the panels 450 at a particular location. In response, an external excitation (which may be the force F itself) may cause the beads 100 to congregate near the location where the force is being received. When congregated, the beads 100 may prevent breakage of the window. Or, the sensor may determine a particular wave pattern of a force received upon one of the panels 450 (e.g., sound waves), and may cause the response units 200 to vibrate in an inverse or strategically shaped wave pattern which may attenuate the sound waves travelling through the panel 450.

In another embodiment, the panels 450 themselves may be constructed directly from a ceramic material, such as AlON. Here, a sensor may be distributed at or near one or more of the panels in order to sense changes in or around the environment of the panels 450. The panels 450 may exhibit superior anti-breakage properties. Additionally, due to the transparent nature of the ceramic material, sensors, external excitation means (e.g., lasers), and even users can penetrate or see through the panels 450 in order to measure and/or ascertain changes in the environment of the panels 450. For example, lasers may be directed through the panels 450, and sensors may be able to measure the spectral response of the wave distribution of the laser through the other side of the panels 450.

In another embodiment, the carrier 300 may be asphalt, concrete, silicone, epoxy, gravel, clay, sand, dirt, etc. The beads 100 may be distributed into the asphalt composition before the asphalt is laid. The beads 100 may cure into the asphalt for providing sensing and controlled response capabilities directly from the surface. Some of the response units 200 of the beads 100 may include piezoelectric elements that can harvest energy (e.g., from the vibrations caused by movement of cars over the roadway, geothermal differential temperatures, etc.). The piezoelectric elements may further allow the beads 100 to provide a controlled response to an external stimulus. For example, a signal sent to the beads 100 in the asphalt may cause the response unit 200 to vibrate or otherwise respond to the stimulus (e.g., change in chemical properties, temperature, shape, radio-frequency transmission, etc.). This may cause an increase in the temperature of the beads 100, which may be used to melt snow or ice accumulated on top of the roadway. The resulting temperature changes (e.g., thermal cycles) may also be selectively initiated and controlled from a remote location in order to repair fractures in the roadways (e.g., micro-fracture repairs within layers of the roadway). Others of the response units 200 may include sensors (e.g., cameras or video recorders) that can view the environment, which information may be communicated to a user (e.g., over a network) for monitoring purposes. As discussed elsewhere herein, the beads 100 may be tuned to a particular resonant frequency such that the health of the asphalt can be monitored through external excitation of the beads 100 and measurement of the spectral response of the external excitation. The beads 100 may be optionally configured, e.g., via the response unit 200, to determine specific locations of vehicles in real-time, act as GPS indicators, and generate and communicate safety alerts. The beads 100 may therefore allow for the real-time monitoring of the roadway for the purpose of extending the life of the roadway and providing efficient and effective road patching and safer, more environmentally conscious road travel.

Optionally, the carrier 300 may include additional particles, such as the particles described in U.S. patent application Ser. Nos. 15/365,923 and 15/678,392.

In still another embodiment, the carrier 300 may be the material that a certain object is made of. For example, the beads 100 may be incorporated during glass batch preparation as a constituent of the glass batch. Because many of the ceramic materials, including AlON, can withstand extreme temperatures, the beads 100 may maintain their integrity during the intense glass-forming processes. Once the beads 100 form a part of the material that an object is made of, the beads 100 may be used to monitor the health of the object, as well as provide information to and from the object. Consider, for example, a wine glass for use in the restaurant industry, wherein the glass is embedded with a plurality of beads 100. The wine glass may be configured such that it has a certain known resonant frequency when the glass is filled above a certain ideal capacity. When a wine glass is deployed for use by a restaurant patron, the bar tender may ensure that the wine glass is filled at least to that capacity. Over the course of the patron's visit, external excitations may be initiated to excite the beads 100 in the wine glass. The resultant response (which may be measured by a sensor at or near the wine glass) can tell the bar tender whether the wine glass is below the ideal capacity, because the frequency and amplitude of the response as measured by the sensor will be different when the capacity is below the ideal level than when it is above the ideal level. If it is determined that the level of wine in the glass is below the ideal level, the bar tender can encourage the wait staff to try to sell additional wine to the patron.

Incorporating the beads 100 directly into the material may be further beneficial to provide increased strength to the material. And, as described elsewhere herein, the beads 100 may include a response unit 200 which may allow the beads 100 to respond to changes in the environment. For example, the beads 100 with a response unit 200 (e.g., a piezoelectric element) may be configured to sense impacts upon the wine glass which cause the wine glass to move from an inactive state (e.g., tip over). The location of the impact may be determined, as well as the force of the impact. When an impact is determined to be acting upon the wine glass causing movement of the glass, the piezoelectric elements in the beads 100 near the impact may begin to vibrate according to the force of the impact. This vibration may counteract the force of the impact, thus preventing the wine glass from undesirably tipping over.

In still yet another embodiment, the ceramic material may be provided as part of a layered substrate, such as a laminate. For example, AlON beads 100, such as those described above, may be distributed in a pattern between laminate sheets containing a flexible material, such as an adhesive carrier or other composition. The AlON beads 100 may provide protection for sensors and/or the rigidity and bulletproof hardening to the more flexible substrates.

In another embodiment, a material substrate composed of one or more ceramic materials with embedded sensors may be configured as a screen for a cell phone. The substrate may have superior scratch and breakage resistance as compared to other materials. The sensors may be configured for communication with other phone subsystems, and due to the transparent nature of the substrate, may be able to sense changes in the environment optically (e.g., that the phone is falling, in water, etc.) and take action (e.g., shut off sensitive systems) to prevent damage to the phone via the response unit 200. The sensors may also include the capability of biometric data acquisition such as sweat, blood, bacteria, urine and other biofluids/biofilms. By utilizing a smooth and chemically inert surface, the lab-on-a-chip functionality of such a substrate could provide security, health, and legal screening capabilities (e.g., drug detection).

Because of the inert nature of aluminum oxynitride, in particular, but also other possible ceramic materials, the beads 100 may be specifically useful in biological applications. Here, the response unit 200 may include a fluorescent composition (e.g., fluid) which may fluoresce inside the body in response to an external stimulation. For example, one or more beads 100 may be swallowed by a user (e.g., via incorporation into a capsule with a dissolvable outer layer). Once inside the body, a medical professional can initiate external excitation (e.g., magnetic resonance via MM) which may cause the material to fluoresce. The medical professional can run tests, and because of the transparent nature of the beads 100, can see the fluorescing material as the beads 100 travel through the user's body. This provides a unique perspective to medical professionals during the testing phase, which heretofore has not been possible. Uniquely, the beads 100 may be recoverable (e.g., through routine body movements) and recyclable.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

What is claimed is:

1. A system for sensing and providing a controlled response to changes in a particle environment, comprising:
 a particle, comprising:
  an outer shell;
  a hollow inner core; and
  a response unit housed inside the hollow inner core, the response unit being configured to transmit data to a user;
 a carrier, wherein the particle is distributed within the carrier; and
 an external excitation source;
 wherein:
  the external excitation source activates the response unit to transmit data, wherein the data is a unique attribute about the carrier;
  the response unit is further configured to provide a controlled response based on the unique attribute about the carrier; and
  the external excitation source further stimulates the response unit to provide the controlled response in response to the transmission of data from the response unit.

2. The system of claim 1, wherein the particle comprises aluminum oxynitride.

3. The system of claim 1, wherein the response unit is a piezoelectric element.

4. The system of claim 1, wherein the carrier is selected from the list consisting of: glass, gel, foam, caulk, plastic, asphalt, and a curable fluid.

5. The system of claim 1, wherein the controlled response is at least one of a temperature response and a vibration response.

6. The system of claim 1, wherein the response unit is a camera.

7. The system of claim 1, wherein:
 the response unit comprises a sensor and a controlled response element;
 the sensor is selected from the list consisting of a temperature sensor, a pressure sensor, and an optical device; and
 the controlled response element is selected from the list consisting of a chemical compound, a piezoelectric element, and an optical device.

8. A system for sensing and providing a controlled response to changes in a particle environment, comprising:
 a particle, comprising:
  an outer shell;
  a hollow inner core; and
  a response unit housed inside the hollow inner core, the response unit being configured to transmit data to a user;
 a carrier, wherein the particle is distributed within the carrier; and
 an external excitation source;
 wherein:
  the external excitation source activates the response unit to transmit data, wherein the data is a unique attribute about the carrier; and the external excitation source further stimulates the response unit to provide the controlled response in response to the transmission of data from the response unit the controlled response is at least one of a temperature response and a vibration response.

9. The system of claim 8, wherein the particle comprises aluminum oxynitride.

10. The system of claim 8, wherein the response unit is a piezoelectric element.

11. The system of claim 8, wherein the carrier is selected from the list consisting of: glass, gel, foam, caulk, plastic, asphalt, and a curable fluid.

12. The system of claim 8, wherein the response unit is a camera.

13. The system of claim 8, wherein:
the response unit comprises a sensor and a controlled response element;
the sensor is selected from the list consisting of a temperature sensor, a pressure sensor, and an optical device; and
the controlled response element is selected from the list consisting of a chemical compound, a piezoelectric element, and an optical device.

14. A method for sensing and providing a controlled response to a particle environment, comprising:
providing a particle, comprising:
an outer shell; and
a response unit housed inside the outer shell, the response unit being configured to transmit data to a user and provide a controlled response based on the transmitted data;
activating an external excitation device to actuate the response unit to determine a first attribute about an environment of the particle;
transmitting the first attribute from the response unit; and
activating the external excitation device to actuate the response unit to provide a controlled response based on the first attribute.

15. The method of claim 14, further comprising:
activating the external excitation device to actuate the response unit to determine a second attribute about the environment of the particle.

16. The method of claim 14, wherein the particle comprises a plurality of particles, and wherein the plurality of particles is disposed within a carrier.

17. The method of claim 16, wherein a portion of the response units of the plurality of particles are actuated in conjunction to provide an amplified controlled response, the remaining.

18. The method of claim 17, wherein the portion of the response units of the plurality of particles that are actuated are within a predetermined distance of an area of the carrier.

19. The method of claim 18, wherein:
each response unit comprises a sensor and a controlled response element;
the sensor is selected from the list consisting of a temperature sensor, a pressure sensor, and an optical device; and
the controlled response element is selected from the list consisting of a chemical compound, a piezoelectric element, and an optical device.

20. The method of claim 19, wherein at least one of the sensor and the controlled response element of a first particle of the plurality of particles is different from the sensor and the controlled response element of a second particle of the plurality of particles.

* * * * *